US011984101B1

(12) United States Patent
Jiang

(10) Patent No.: US 11,984,101 B1
(45) Date of Patent: May 14, 2024

(54) GUITAR WALL MOUNT

(71) Applicant: Mingsong Jiang, Yulin (CN)

(72) Inventor: Mingsong Jiang, Yulin (CN)

( * ) Notice: Subject to any disclaimer, the term of this patent is extended or adjusted under 35 U.S.C. 154(b) by 0 days.

(21) Appl. No.: 18/354,451

(22) Filed: Jul. 18, 2023

(51) Int. Cl.
*G10G 1/00* (2006.01)
*G10G 5/00* (2006.01)

(52) U.S. Cl.
CPC .................................... *G10G 5/00* (2013.01)

(58) Field of Classification Search
CPC ........................................ G10G 5/00
See application file for complete search history.

(56) References Cited

U.S. PATENT DOCUMENTS 6,204,440 B1 * 3/2001 Yu ........................ G10G 5/00 84/421
6,481,677 B1 * 11/2002 Yu ........................ A47F 5/083 84/327
7,484,701 B2 * 2/2009 Hsieh ........................ F16B 2/12 211/85.6
D604,961 S * 12/2009 Barry ........................ D6/682
8,028,966 B2 * 10/2011 Chen ........................ A47F 5/0006 211/94.01
8,528,871 B2 * 9/2013 Begic ........................ A47B 96/067 248/221.11
9,902,589 B2 * 2/2018 Gregory ........................ B65H 54/585
11,311,130 B1 * 4/2022 Ebersole ........................ A47B 61/003
11,727,903 B2 * 8/2023 Carr ........................ G10G 5/00 84/327
11,776,517 B2 * 10/2023 Gupta ........................ F16M 11/2014 84/453
2005/0247653 A1 * 11/2005 Brooks ........................ A47F 5/0846 211/94.01
2008/0023608 A1 * 1/2008 Hsieh ........................ A47F 5/0853 248/307
2011/0303798 A1 * 12/2011 Bader ........................ A47F 5/0846 248/65
2021/0005172 A1 * 1/2021 Spriewald ........................ G10G 5/00
2022/0310044 A1 * 9/2022 Gupta ........................ F16M 11/245

* cited by examiner

*Primary Examiner* — Robert W Horn
(74) *Attorney, Agent, or Firm* — Daniel M. Cohn; Howard M. Cohn

(57) ABSTRACT

A guitar wall mount having wall hanging units that are movable and detachable includes a fixed base and the wall hanging units. The fixed base includes base rails. The base rails are horizontally assembled in sequence. The wall hanging units are detachably mounted on the base rails, and the wall hanging units are slidable along the base rails. One or more base rails are selected according to requirements. The guitar wall mount is mounted to a wall by tools such as screws, wall anchors, etc. The wall hanging units are able to be combined in various ways to meet placement and hanging requirements of stringed instruments, so the stringed instruments are hung neatly and beautifully. The wall hanging units are detachably mounted on the base rails, so the wall hanging units are able to be mounted independently or mounted together according to needs.

18 Claims, 5 Drawing Sheets

GUITAR WALL MOUNT

TECHNICAL FIELD

The present disclosure relates to a technical field of guitar wall mounts, and in particular to a guitar wall mount having wall hanging units that are movable and detachable.

BACKGROUND

A guitar is a stringed instrument, which generally comprises a guitar body, a guitar neck, and a headstock. A string bridge and a saddle are installed on the guitar body. There are fingerboard, fret points, and frets on the guitar neck. Machine heads are arranged on the headstock. Many important structures of the guitar are exposed and are easily damaged when touched with great force or dropped, so the guitar needs to be carefully treated.

Currently, conventional guitar wall mounts need to be neatly arranged in a row, and the conventional guitar wall mounts are generally aligned manually during installation. Because the conventional guitar wall mounts are artificially arranged, an uniformity thereof is not satisfactory. Therefore, guitars hung on the conventional guitar wall mounts are not neatly arranged. In addition, because positions of the conventional guitar wall mounts are not limited with respect to each other, when one of the conventional guitar wall mounts falls sideways, adjacent conventional guitar wall mounts fall like dominoes, so the conventional guitar wall mounts are not safe to use.

Therefore, it is necessary to provide a guitar wall mount having wall hanging units that are movable and detachable to solve the above technical problems.

SUMMARY

In view of deficiencies of the prior art, a main purpose of the present disclosure is to provide a guitar wall mount having wall hanging units that are movable and detachable, which effectively solves problems of unaesthetic and unsafe use of conventional guitar wall mounts.

To achieve the above purpose, the present disclosure provides the guitar wall mount having the wall hanging units that are movable and detachable. The guitar wall mount comprises a fixed base and the wall hanging units.

The fixed base comprises base rails. The base rails are horizontally assembled in sequence. The wall hanging units are detachably mounted on the base rails, and the wall hanging units are slidable along the base rails.

Optionally, each two adjacent base rails are fixed together by a connecting piece.

Optionally, middle portions of two adjacent ends of each two adjacent base rails define first snap holes, and first snap buttons are arranged on two ends of each connecting piece. The two first snap buttons of each connecting piece are respectively connected to the first snap holes on corresponding two adjacent base rails.

Optionally, the first snap holes are circular holes. The first snap buttons are circular.

Optionally, each connecting piece is of a square block structure. A bottom portion of each of the base rails defines an embedding groove. Each connecting piece is matched with a corresponding embedding groove. Each connecting piece is embedded in the corresponding embedding groove for fixing.

Optionally, end covers are respectively arranged on an end portion of a first base rail and an end portion of a last base rail of the base rails. Other base rails are arranged between the first base rail and the last base rail.

Optionally, both a middle portion of an outer end of the first base rail and a middle portion of an outer end of the last base rail define a second snap hole. A second snap button is protruded from each of the end covers. Each second snap button is snapped in a corresponding second snap hole.

Optionally, each second button hole is a circular hole. Each second snap button is circular.

Optionally, each of the wall hanging units comprises a support base, a support top rod, and a support top bracket. Each support base is matched with the base rails and is mounted on the base rails. Each support base is slidable along the base rails. A lower end of each support top rod is fixed to a corresponding support base. A lower end of each support top bracket is arranged on an upper end of a corresponding support top rod.

Optionally, limiting concave frames are arranged on two sides of each of the base rails. A limiting protrusion is arranged in each of the limiting concave frames. Limiting plates are respectively arranged on two sides of each support base. Bending portions of the two sides of each support base are respectively embedded into the two limiting concave frames of a corresponding base rail. Each limiting protrusion limits a corresponding limiting plate to abut against an inner side of a corresponding limiting concave frame.

Optionally, the limiting plates of each support base integrally extend from each support base.

Optionally, mounting holes are defined on each of the limiting plates.

Optionally, the mounting holes are arranged along a length direction of each of the limiting plates.

Optionally, a fixing hole is defined on a center of each support base. The lower end of each support top rod is inserted into and fixed in the fixing hole of the corresponding support base.

Optionally, each fixing hole is a screw hole. External threads are arranged on the lower end of each support top rod. Each fixing hole is screwed with the external threads of a corresponding support rod.

Optionally, the lower end of each support top bracket is connected to the upper end of the corresponding support top rod through a connecting screw. Each support top bracket is capable of swinging back and forth with respect to the corresponding support top rod.

Optionally, the upper end of each support top rod is battered to form a first connecting plate. A first screwing hole is defined on each first connecting plate. The lower end of each support top bracket is battered to form a second connecting plate. Each second connecting plate is stacked on a corresponding first connecting plate. A through hole is defined on each second connecting plate. Each connecting screw passes through a corresponding through hole to screw with a corresponding first screwing hole.

Optionally, a hand wheel is arranged on an outer end of each connecting screw.

Optionally, each support top rod is a cylindrical straight rod.

Optionally, each support top bracket comprises a straight rod portion, a U-shaped portion, and a nut. A second screwing hole is defined on a top end face of each straight rod portion. A stud is arranged on a bottom end of each U-shaped portion. Each stud is screwed with a corresponding second screwing hole. Each nut is screwed with a corresponding stud. Each nut and the corresponding stud are arranged between a corresponding U-shaped portion and a corresponding straight rod portion.

Compared with the prior art, in the present disclosure, the base rails are assembled together and the bases rails can be mounted independently for use. One or more base rails are selected according to requirements. The guitar wall mount is mounted to a wall by tools such as screws, wall anchors, etc. The wall hanging units are able to be combined in various ways to meet placement and hanging requirements of different numbers of stringed instruments, so the stringed instruments are hung neatly and beautifully. The guitar wall mount is safe to use, and the wall hanging units are detachably mounted on the base rails, so the wall hanging units are able to be mounted independently or mounted together according to needs, which is flexible and convenient to use.

10—fixed base; 11—base rail; 111—first snap hole; 112—embedding groove; 113—the second snap hole; 114—limiting concave frame; 115—limiting protrusion; 12—connecting piece; 121—first snap button; 13—End cover; 131—second snap button; 20—wall hanging unit; 21—support base; 211—limiting plate; 22—support top rod; 221—first connecting plate; 23—support top bracket; 231—straight rod portion; 232—U-shaped portion; 233—second connecting plate; 234—nut; 24—connecting screw; 241—hand wheel; 201—mountingn hole; 202—fixing hole; 203—first screwing hole; 204—through hole; 205—second screwing hole; 206—stud.

DETAILED DESCRIPTION

Figure 1:
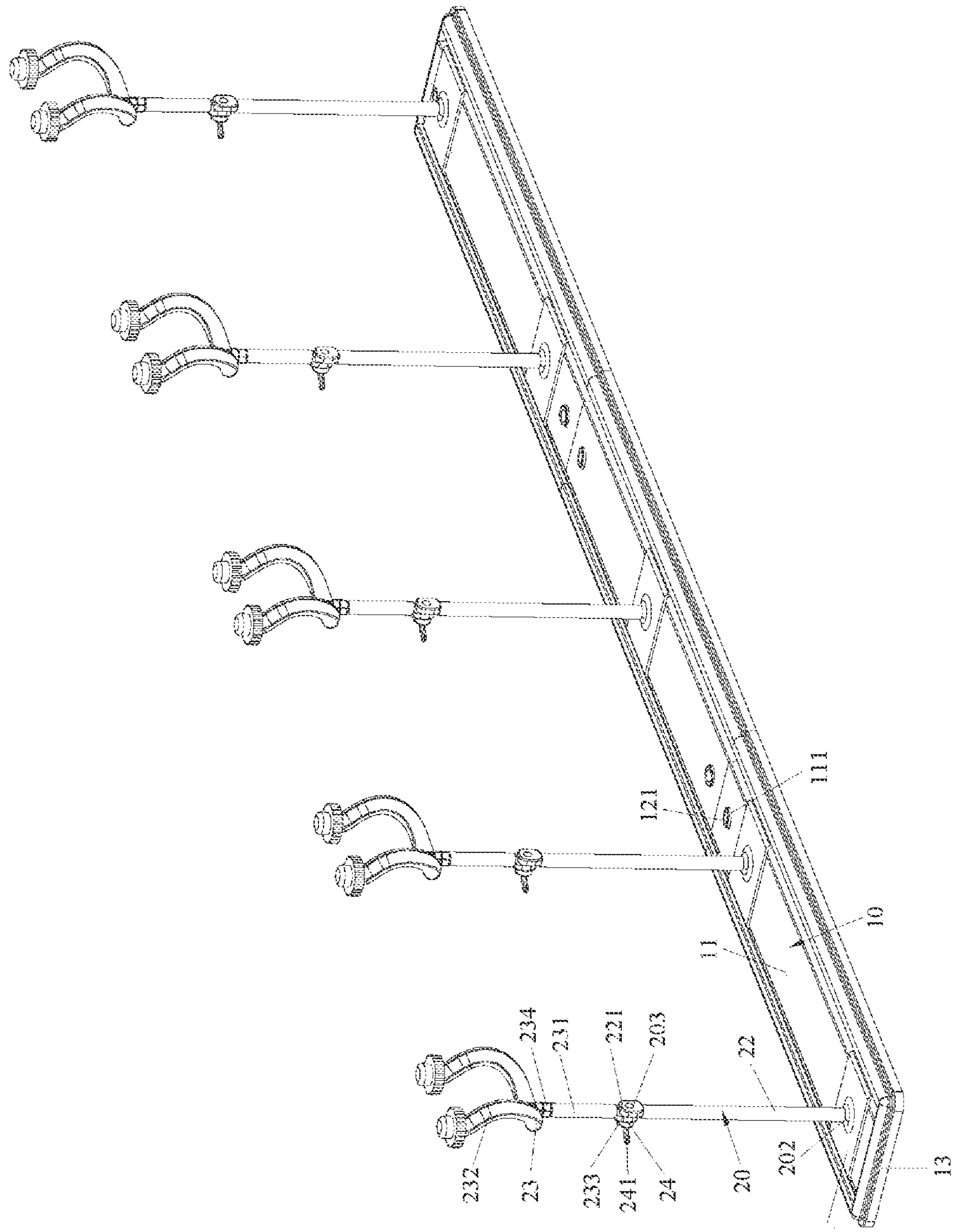
FIG. 1 is a perspective schematic diagram of a guitar wall mount according to one optional embodiment of the present disclosure.
Figure 2:
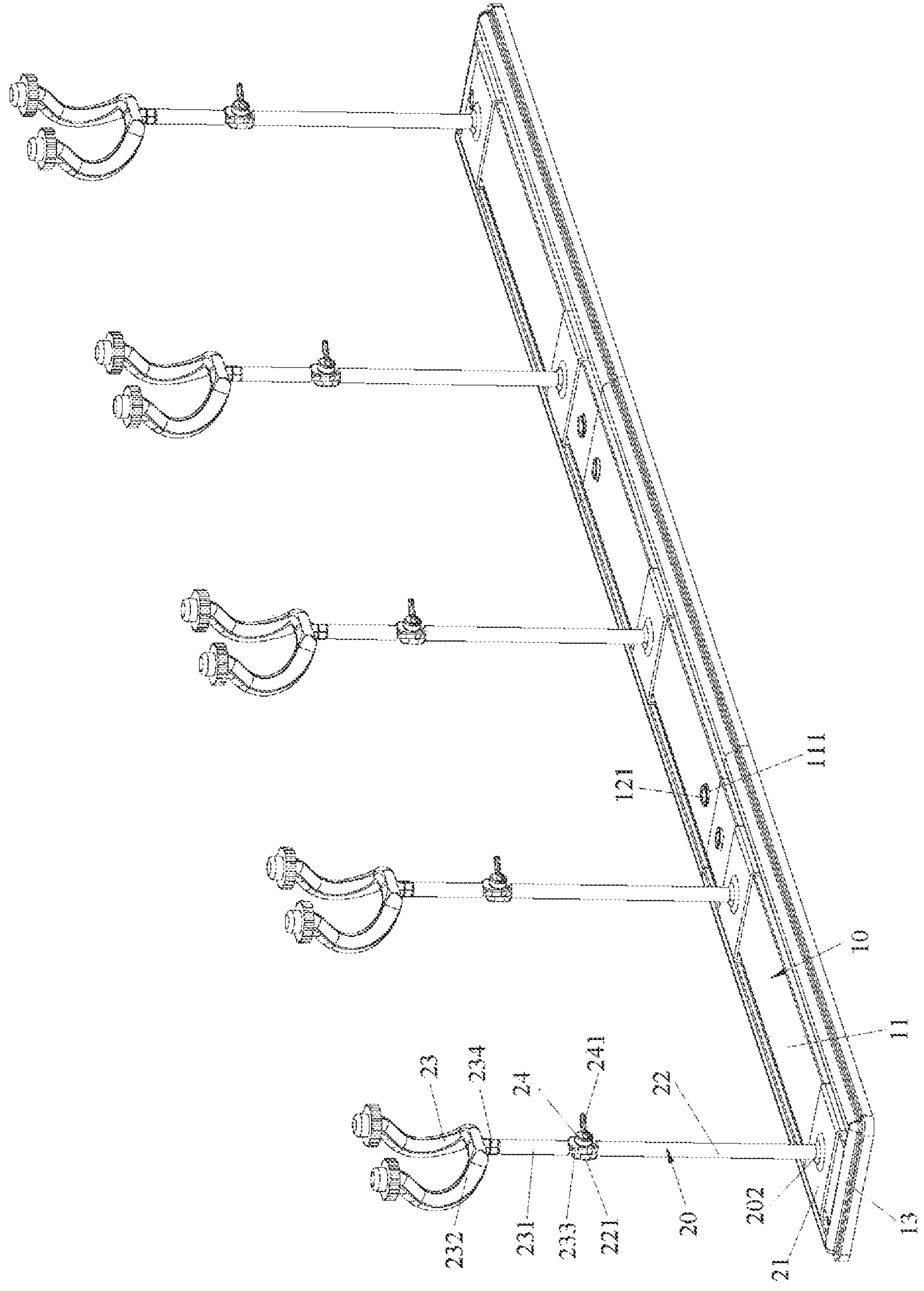
FIG. 2 is another perspective schematic diagram of the guitar wall mount according to one optional embodiment of the present disclosure.
Figure 3:
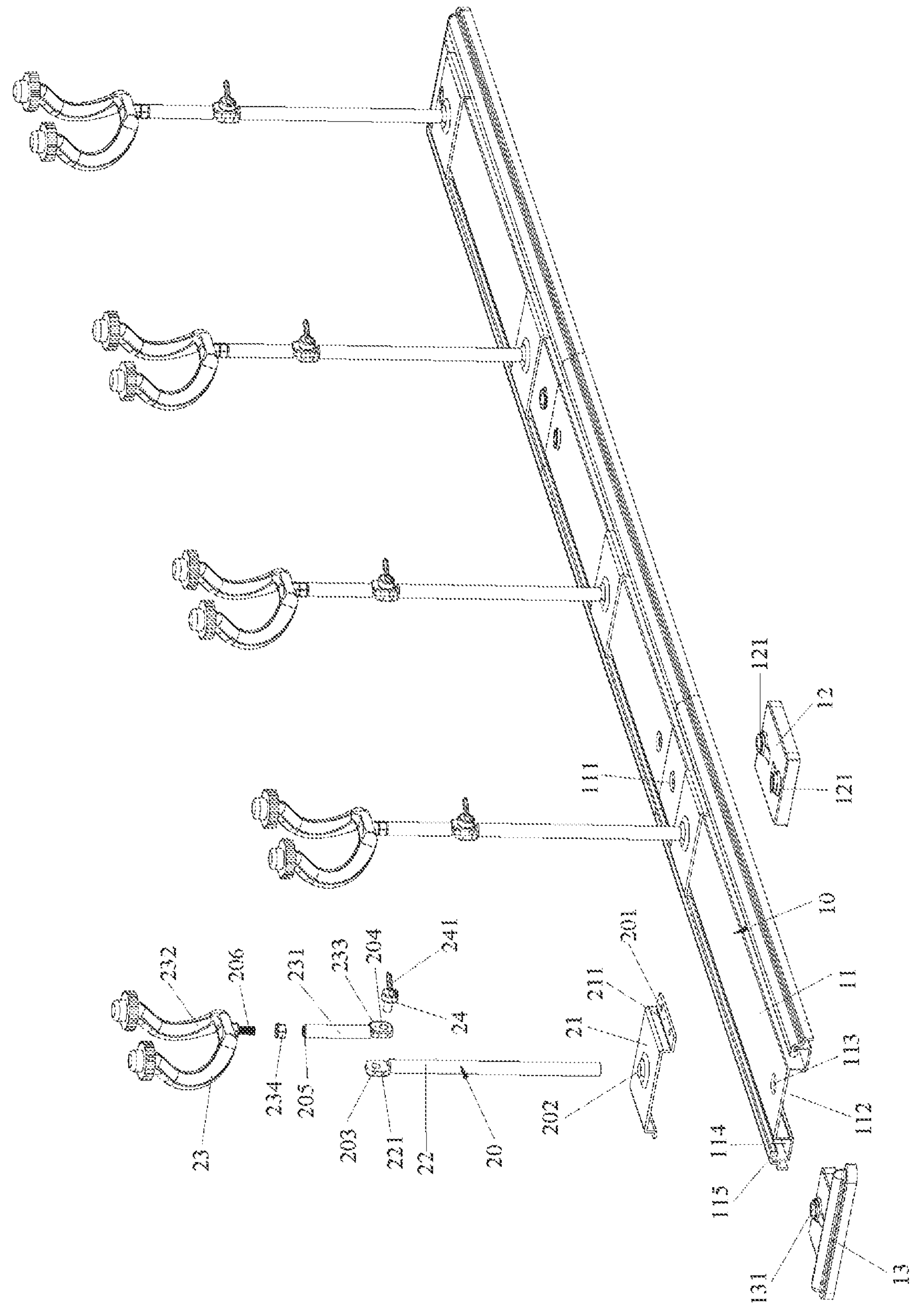
FIG. 3 is an exploded schematic diagram of the guitar wall mount according to one optional embodiment of the present disclosure.
Figure 4:
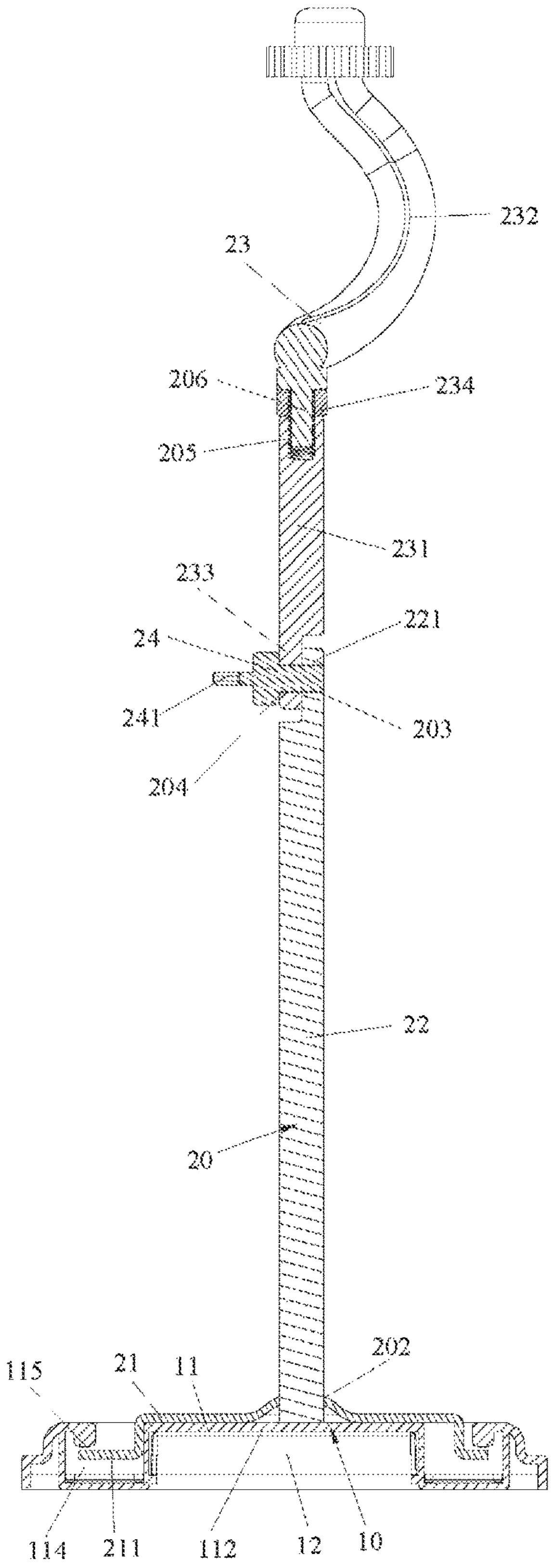
FIG. 4 is a cross-sectional schematic diagram of the guitar wall mount according to one optional embodiment of the present disclosure.
Figure 5:
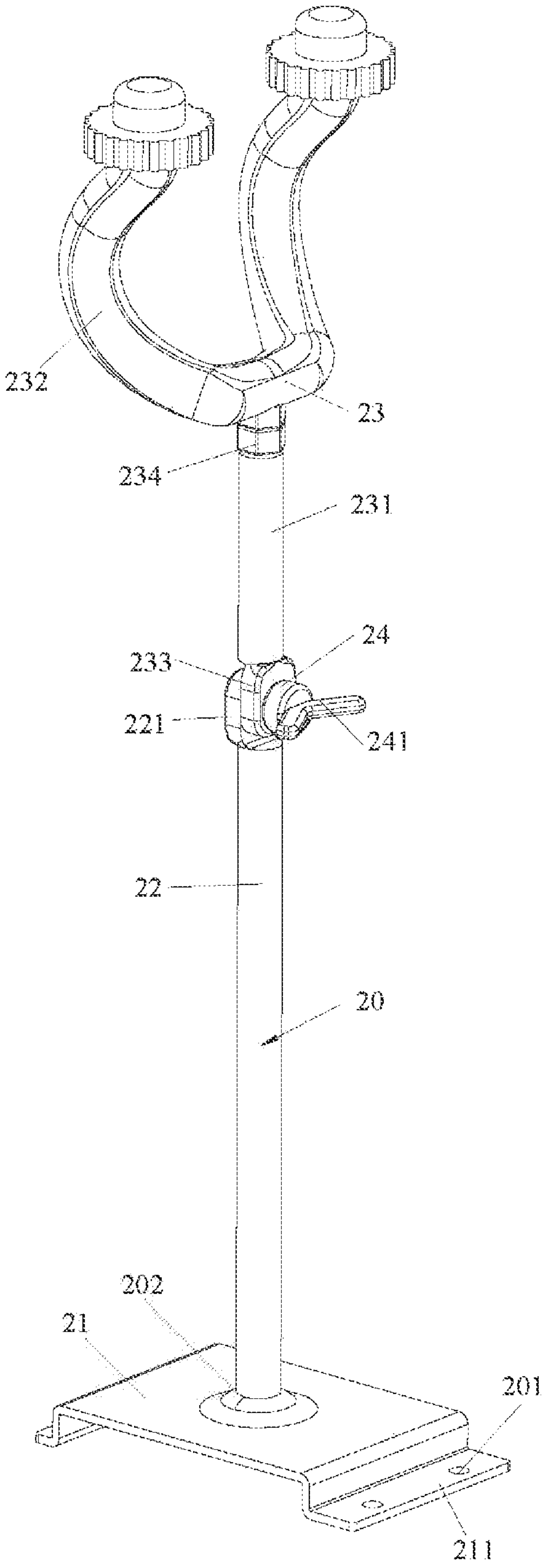
FIG. 5 is a schematic diagram of a wall hanging unit according to one optional embodiment of the present disclosure.

As shown in FIGS. 1-5, a specific structure of a guitar wall mount having the wall hanging units that are movable and detachable according to one optional embodiment of the present disclosure is shown. The guitar wall mount comprises a fixed base 10 and the wall hanging units 20.

The fixed base 10 comprises base rails 11. The base rails 11 are horizontally assembled in sequence. Specifically, each of the base rails 11 is a metal plate. Each two adjacent base rails 11 are fixed together by a connecting piece 12.

Middle portions of two adjacent ends of each two adjacent base rails 11 define first snap holes 111, and first snap buttons 121 are arranged on two ends of each connecting piece 12. The two first snap buttons 121 of each connecting piece 12 are respectively connected to the first snap holes 111 on corresponding two adjacent base rails 11. Installations and connections between the first snap holes and the first snap buttons is simple and stable. The first snap holes 111 are circular holes. The first snap buttons 121 are circular. The first snap holes 111 and the first snap buttons 121 have simple structures and are beautiful in appearance.

Each connecting piece 11 is of a square block structure. A bottom portion of each of the base rails 11 defines an embedding groove 112. Each connecting piece 12 is matched with a corresponding embedding groove 112. Each connecting piece 12 is embedded in the corresponding embedding groove 112 for fixing.

End covers 13 are respectively arranged on an end portion of a first base rail 11 and an end portion of a last base rail of the base rails 11. Other base rails 11 are arranged between the first base rail 11 and the last base rail 11. Both a middle portion of an outer end of the first base rail 11 and a middle portion of an outer end of the last base rail 11 define a second snap hole 113. A second snap button 131 is protruded from each of the end covers 13. Each second snap button 131 is snapped in a corresponding second snap hole 113. Installation and connection between each second snap hole and each second snap button is simple and stable. Each second button hole 113 is a circular hole. Each second snap button 131 is circular. Each second snap holes 113 and each second snap button 131 have simple structures and are beautiful in appearance. In addition limiting concave frames 114 are arranged on two sides of each of the base rails 11. A limiting protrusion 115 is arranged in each of the limiting concave frames 114.

The wall hanging units 20 are detachably mounted on the base rails 11, and the wall hanging units are slidable along the base rails 11. Specifically, each of the wall hanging units 20 comprises a support base 21, a support top rod 22, and a support top bracket 23. Each support base 21 is matched with the base rails 11 and is mounted on the base rails 11. Each support base 21 is slidable along the base rails 11. A lower end of each support top rod 22 is fixed to a corresponding support base 21. A lower end of each support top bracket 23 is arranged on an upper end of a corresponding support top rod 22.

Limiting plates 211 are respectively arranged on two sides of each support base 21. Bending portions of the two sides of each support base 21 are respectively embedded into the two limiting concave frames 114 of a corresponding base rail 11. Each limiting protrusion 115 limits a corresponding limiting plate 211 to abut against an inner side of a corresponding limiting concave frame 114. Each support base 21 is movable horizontally to a proper position on the fixed base 10, so that each support base 21 is stably and neatly fixed on the fixed base 10, which is convenient to improve support stability and aesthetics of stringed instruments when displayed.

The limiting plates 211 of each support base 21 integrally extend from each support base 21, so each support base 21 is stable in structure. Mounting holes 201 are defined on each of the limiting plates 211. The mounting holes 201 are arranged along a length direction of each of the limiting plates 211.

A fixing hole 202 is defined on a center of each support base 21. Each fixing hole 202 is a screw hole. Each support top rod 22 is a cylindrical straight rod. The lower end of each support top rod 22 is inserted into and fixed in the fixing hole 202 of the corresponding support base 21. External threads (not shown in the drawings) are arranged on the lower end of each support top rod 22. Each fixing hole 202 is screwed with the external threads of a corresponding support rod 22. The upper end of each support top rod 22 is battered to form a first connecting plate 221. A first screwing hole 203 is defined on each first connecting plate 221. The lower end of each support top bracket 23 is connected to the upper end of the corresponding support top rod 22 through a connecting screw 24. Each support top bracket 23 is capable of swinging back and forth with respect to the corresponding support top rod 22.

In the embodiment, each support top bracket 23 comprises a straight rod portion 231, a U-shaped portion 232, and a nut 234. A second screwing hole 205 is defined on a top end face of each straight rod portion. A stud 206 is arranged on a bottom end of each U-shaped portion 232. Each stud 206 is screwed with a corresponding second screwing hole 205. Each nut 234 is screwed with a corresponding stud 206. Each nut 234 and the corresponding stud 206 are arranged between a corresponding U-shaped portion 232 and a corresponding straight rod portion 231. Each nut 234 and the corresponding stud 206 are configured to adjust and fix a mounting position of the corresponding U-shaped portion 232, thereby realizing multi-angle placement of the stringed instruments.

The lower end of each support top bracket 23 is battered to form a second connecting plate 233. Each second connecting plate 233 is stacked on a corresponding first connecting plate 221. A through hole 204 is defined on each second connecting plate 233. Each connecting screw 24 passes through a corresponding through hole 204 to screw with a corresponding first screwing hole 203.

A hand wheel 241 is arranged on an outer end of each connecting screw 24, which facilitates an operation thereof.

A working principle of the guitar wall mount is as follow.

When in use, one or more base rails are selected according to requirements. The base rails are mounted to a wall by tools such as screws, wall anchors, etc. The wall hanging units are able to be combined in various ways to meet the placement and hanging requirements of different numbers of the stringed instruments, A position of each support top bracket 23 with respect to the corresponding support top rod 22 is adjusted by tightening or loosening a corresponding hand wheel 241, which realizes a rotation and a fixation of each support top bracket 23, thereby facilitating a storage of the guitar wall mount.

An angle of each support top bracket 23 is adjusted by the corresponding hand wheel 241, so a placement angle of each of the stringed instruments is adjusted and diversification of placements of the stringed instruments is realized. In addition, mounting holes 201 are on the limiting plates 211, and the limiting plate 211 of each support base 21 are integrally connected to each support base 21, so each support base 21 is able to be separately removed from the fixed base 10 for use, which is very convenient.

In the present disclosure, the base rails are assembled together and the bases rails can be mounted independently for use. One or more base rails are selected according to requirements. The guitar wall mount is mounted to the wall by tools such as the screws, the wall anchors, etc. The wall hanging units are able to be combined in various ways to meet the placement and hanging requirements of different numbers of the stringed instruments, so the stringed instruments are hung neatly and beautifully. The guitar wall mount is safe to use, and the wall hanging units are detachably mounted on the base rails, so the wall hanging units are able to be mounted independently or mounted together according to needs, which is flexible and convenient to use.

The above describes technical principles of the present disclosure in conjunction with specific embodiments. These descriptions are only for explaining the principles of the present disclosure, and cannot be construed as limiting the protection scope of the present disclosure in any way. Based on the explanations herein, those skilled in the art can think of other specific embodiments of the present disclosure without creative efforts, which should all fall within the protection scope of the present disclosure.

What is claimed is:

1. A guitar wall mount, comprising:

a fixed base, and wall hanging units;

wherein the fixed base comprises base rails; the base rails are horizontally assembled in sequence; the wall hanging units are detachably mounted on the base rails, and the wall hanging units are slidable on the base rails along a horizontal direction of the base rails assembled in sequence;

wherein each two adjacent base rails are fixed together by a connecting piece;

wherein middle portions of two adjacent ends of each two adjacent base rails define first snap holes, and first snap buttons are arranged on two ends of each connecting piece; the two first snap buttons of each connecting piece are respectively connected to the first snap holes on corresponding two adjacent base rails.

2. The guitar wall mount according to claim 1, wherein the first snap holes are circular holes; the first snap buttons are circular.

3. The guitar wall mount according to claim 1, wherein each connecting piece is of a square block structure; a bottom portion of each of the base rails defines an embedding groove; each connecting piece is matched with a corresponding embedding groove; each connecting piece is embedded in the corresponding embedding groove for fixing.

4. The guitar wall mount according to claim 1, wherein end covers are respectively arranged on an end portion of a first base rail and an end portion of a last base rail of the base rails; other base rails are arranged between the first base rail and the last base rail.

5. The guitar wall mount according to claim 4, wherein both a middle portion of an outer end of the first base rail and a middle portion of an outer end of the last base rail define a second snap hole; a second snap button is protruded from each of the end covers; each second snap button is snapped in a corresponding second snap hole.

6. The guitar wall mount according to claim 5, wherein each second button hole is a circular hole; each second snap button is circular.

7. The guitar wall mount according to claim 1, wherein each of the wall hanging units comprises a support base, a support top rod, and a support top bracket; each support base is matched with the base rails and is mounted on the base rails; each support base is slidable along the base rails; a lower end of each support top rod is fixed to a corresponding support base; a lower end of each support top bracket is arranged on an upper end of a corresponding support top rod.

8. The guitar wall mount according to claim 7, wherein limiting concave frames are arranged on two sides of each of the base rails; a limiting protrusion is arranged in each of the limiting concave frames; limiting plates are respectively arranged on two sides of each support base; bending portions of the two sides of each support base are respectively embedded into the two limiting concave frames of a corresponding base rail; each limiting protrusion limits a corresponding limiting plate to abut against an inner side of a corresponding limiting concave frame.

9. The guitar wall mount according to claim 8, wherein the limiting plates of each support base integrally extend from each support base.

10. The guitar wall mount according to claim 8, wherein mounting holes are defined on each of the limiting plates.

11. The guitar wall mount according to claim 10, wherein the mounting holes are arranged along a length direction of each of the limiting plates.

12. The guitar wall mount according to claim 7, wherein a fixing hole is defined on a center of each support base; the lower end of each support top rod is inserted into and fixed in the fixing hole of the corresponding support base.

13. The guitar wall mount according to claim 12, wherein each fixing hole is a screw hole; external threads are arranged on the lower end of each support top rod; each fixing hole is screwed with the external threads of a corresponding support rod.

14. The guitar wall mount according to claim 7, wherein the lower end of each support top bracket is connected to the upper end of the corresponding support top rod through a connecting screw; each support top bracket is capable of swinging back and forth with respect to the corresponding support top rod.

15. The guitar wall mount according to claim 14, wherein the upper end of each support top rod is battered to form a first connecting plate; a first screwing hole is defined on each first connecting plate; the lower end of each support top bracket is battered to form a second connecting plate; each second connecting plate is stacked on a corresponding first connecting plate; a through hole is defined on each second connecting plate; each connecting screw passes through a corresponding through hole to screw with a corresponding first screwing hole.

16. The guitar wall mount according to claim 14, wherein a hand wheel is arranged on an outer end of each connecting screw.

17. The guitar wall mount according to claim 7, wherein each support top rod is a cylindrical straight rod.

18. The guitar wall mount according to claim 7, wherein each support top bracket comprises a straight rod portion, a U-shaped portion, and a nut; a second screwing hole is defined on a top end face of each straight rod portion; a stud is arranged on a bottom end of each U-shaped portion; each stud is screwed with a corresponding second screwing hole; each nut is screwed with a corresponding stud; each nut and the corresponding stud are arranged between a corresponding U-shaped portion and a corresponding straight rod portion.

* * * * *